United States Patent [19]

Kalishman

[11] 4,313,740
[45] Feb. 2, 1982

[54] AIR FILTER

[76] Inventor: Calvin Kalishman, 5 Margaret Rd., Stoneham, Mass. 02180

[21] Appl. No.: 213,819

[22] Filed: Dec. 8, 1980

[51] Int. Cl.³ .............................................. B03C 3/00
[52] U.S. Cl. ...................... 55/131; 55/274; 55/481; 55/482; 55/487; 55/498; 55/510; 55/527
[58] Field of Search ............... 55/498, 418, 510, 482, 55/527, 486–488, 525, 274, 481; 210/484, 492, 497.01, 342

[56] References Cited

U.S. PATENT DOCUMENTS

| | | | |
|---|---|---|---|
| 1,395,833 | 11/1921 | Kling et al. | 55/486 |
| 1,560,790 | 10/1925 | Jordahl | 55/487 |
| 1,896,640 | 2/1933 | Moulding | 55/510 |
| 2,579,441 | 12/1951 | Palmer | 55/131 |
| 3,937,015 | 2/1976 | Akado et al. | 55/498 |
| 4,074,985 | 2/1978 | Willas | 55/510 |
| 4,187,136 | 2/1980 | Nostrand | 210/492 |

FOREIGN PATENT DOCUMENTS 468084   6/1937   United Kingdom ................. 55/274

*Primary Examiner*—Bernard Nozick
*Attorney, Agent, or Firm*—Wolf, Greenfield & Sacks

[57] ABSTRACT

A circular type air filter preferably for automotive applications to filter air flow to the carburetor, has an open plastic housing containing a plurality of individual cartridge filters. The cartridge filters are made of aluminum or copper wool and are of differential porosity with the more dense filters closer to the air inlet whereby the air is diffused through the filter more uniformly.

13 Claims, 3 Drawing Figures

U.S. Patent  Feb. 2, 1982  4,313,740
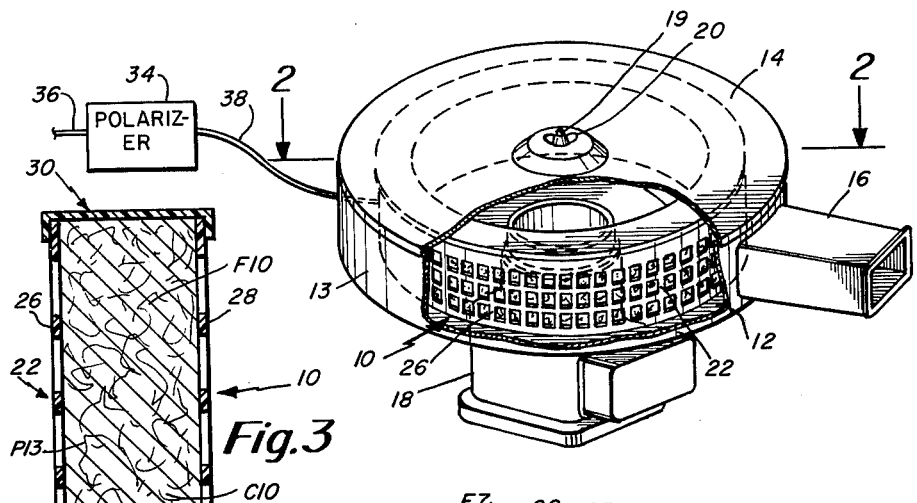
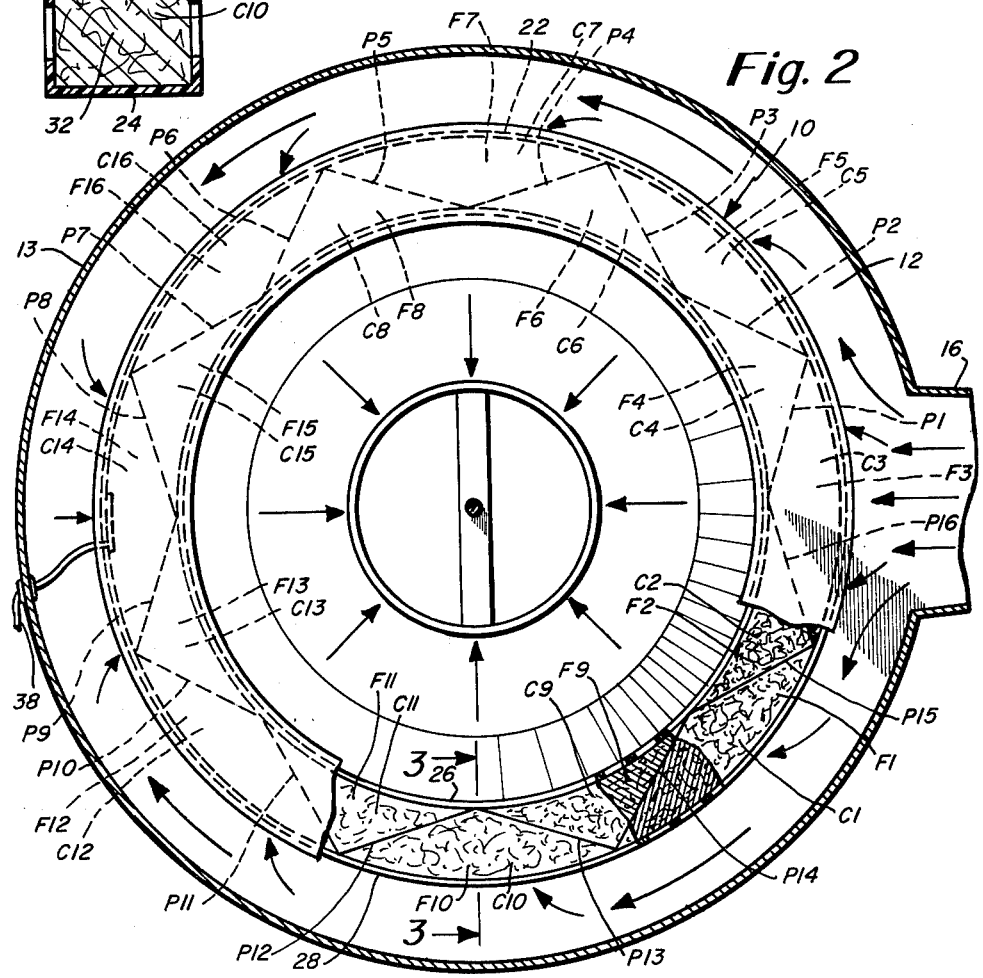

AIR FILTER

BACKGROUND OF THE INVENTION

The present invention relates in general to air filtering and pertains, more particularly, to a filter for filtering air directed to the carburetor of an internal combustion engine. The filter of this invention is an improvement over the conventional toroidal-shaped automotive air filter.

With the conventional filter it is generally necessary to provide replacement thereof after a limited period of use. For example, it is common to replace the air filter with a new filter about every ten thousand miles of driving. These conventional filters are constructed using a type of synthetic fiber that is not easily cleaned and that furthermore provides some impairment to the filtering particularly under damp or wet conditions where the pores of the filter become restricted. Also, the conventional filter is not totally effective in capturing small dust particles which may be permitted to enter the carburetor. Another drawback associated with the conventional filter is that the flow rate through the filter is generally not uniform with a greater flow being experienced into the carburetor throat adjacent the air inlet. Uniformity of flow is significant especially with regard to providing increased gas mileage. Existing filters also have a drawback especially after a period of usage, of a decreasing flow rate which degrades the gas mileage of the vehicle.

Accordingly, it is an object of the present invention to provide an improved automotive air filter that is adapted to increase the automobile mileage. With the filter of this invention it has been found that a 3-4 mile per gallon increase is possible on a tuned vehicle.

Another object of the present invention is to provide an improved air filter that is constructed to provide a more uniform flow of air all about the filter to thus provide uniform air flow into the throat of the carburetor.

A further object of the present invention is to provide an air filter that is adapted for the attraction of dust particles even of small size to thereby substantially reduce any dirt or the like and prevent its entry into the carburetor.

Still another object of the present invention is to provide a filter that may be readily cleaned by the operator of the vehicle. The filter of this invention is preferably cleaned simply by washing in a warm soap solution at periodic driving intervals.

Still a further object of the present invention is to provide an improved automotive filter that is adapted for uniform operation regardless of environmental conditions. The filter of this invention is characterized by substantially no impairment of the filtering function even in damp or wet environments.

Another object of the present invention is to provide an automotive filter that need not be replaced but that can be cleaned and that, furthermore, has replaceable cartridge filter sections that can be replaced rather than replacing the entire filter. The basic filter construction of this invention is adapted to be used for the life of the vehicle.

SUMMARY OF THE INVENTION

To accomplish the foregoing and other objects of this invention there is provided an air filter for filtering the air to the carburetor of an internal combustion engine. The air filter comprises a housing having a bottom, a top, and inner and outer air-pervious side walls, means defining an air inlet at one side of the housing, and a plurality of replaceable cartridge filters adapted to fit in the housing and each comprising a metal wool. The individual cartridge filters have differential porosity with the more dense filter disposed closer to the air inlet and the less dense filter disposed remote from the air inlet. In this way uniform air diffusion is provided through the different filter sections. The air filter of the present invention is preferably adapted for automotive usage and is thus used in combination with a support base with the filter being adapted to fit onto the support base overlying the throat of the carburetor so that air diffused through the filter passes to the open center thereof and into the carburetor throat. The individual cartridge filters may be color coded to denote the different wool denotations. There is also additionally provided a conventional type cover overlying the filter to provide a substantially closed filter chamber with the only input thereto being at the air inlet. The cartridge filters may comprise at the least two, one having a higher density packing of the wool than the other with the said one filter disposed at the inlet. In the disclosed embodiment described herein, there are provided a total of 16 separate cartridge filters separated into three different density groups. In such an arrangement, the less dense filters are progressively disposed about the housing further from the air inlet. Also, in the preferred embodiment the metal wool comprises either aluminum or copper. The housing is preferably plastic with the side walls being formed in a grid arrangement. Also, it is preferred that the metal wool have a charge maintained thereon for the purpose of attracting dust particles so that little or no dirt will be permitted to enter the carburetor.

BRIEF DESCRIPTION OF THE DRAWINGS

Numerous other objects, features and advantages of the invention should now become apparent upon a reading of the following detailed description taken in conjunction with the accompanying drawing, in which:

FIG. 1 is a perspective view of an air filter constructed in accordance with the present invention partially cut away to show the filter construction;

FIG. 2 is a plan view of the filter depicted in FIG. 1; and

FIG. 3 is a cross-sectional view taken along line 3—3 in FIG. 2.

DETAILED DESCRIPTION

Referring now to the drawings there is shown a preferred embodiment for the air filter of this invention. The air filter is described in connection with an automotive application to filter air flow to a carburetor. The air filter of the present invention is particularly adapted for providing increased automotive gasoline mileage and is characterized by an improved uniformity of air flow into the carburetor.

The drawings show the air filter 10 in conjunction with an air cleaner housing that comprises a support base 12 that usually has a peripheral side wall 13 along with an overlying cover 14. The base and cover together define a substantially closed filter chamber. FIG. 1 also shows the air inlet duct 16 which couples through the peripheral side wall to permit communication of air into the closed filter chamber. The air inlet may be directly from the ambient, or may also be coupled from another air source such as typically from the exhaust manifold area. FIG. 1 also shows the carburetor 18 upon which the support base 12 rests. The entire air cleaner housing is typically secured to the carburetor by means of an elongated bolt 19 extending from the carburetor along with a butterfly securing nut 20 for holding the cover 14 in place.

The air filter 10 consists of a circular shaped housing 22, having bottom 24, inner and outer air pervious side walls 26 and 28, top 30 and individual cartridge filters F1 through F16. Air pervious partitions P1 through P16 lie between the inner and outer pervious walls and in association with the aforementioned walls form three-sided chambers C1 through C16 which receive the individual cartridge filters F1 through F16, respectively. In a preferred embodiment, the air pervious walls form a toroid with an inner diameter of 8 inches, an outer diameter of 10 inches. The sixteen filters are basically of two different sizes including an outer array slightly larger than those in the inner array. Each array has identical size filters. As shown in FIG. 3, metal wool 32 fills each cartridge filter, with the resulting wool density falling within one of three categories: maximum, medium, or minimum. Individual cartridge filters F1 through F5 have a maximum wool density, filters F6 through F11 a medium wool density, and filters F12 through F16 a minimum wool density. The cartridge filter arrangement places the high density filters nearest air inlet 16, the low density filters farthest away from the air inlet and the medium density filters in between as shown in FIG. 2. In a preferred embodiment, aluminum or copper wool is used, and the inner and outer pervious walls are formed in a grid arrangement. The aforementioned grid may have openings approximately $\frac{3}{8}$ inch square.

Top 30 is removable, being otherwise held in place by cover 14, allowing the removal of each cartridge filter individually as required for either cleaning or replacement without the necessity of removing the entire air filter from the air cleaner housing. Fastening cover 14 holds the top in place. The air filter may also be removed as a unit for cleaning. In a preferred embodiment, housing 22 is made of plastic. The entire filter or the individual cartridge filters may be readily cleaned with a warm soap solution at periodic driving intervals.

In operation, in connection with the automotive application previously mentioned to filter air flow to the carburetor 18, air is drawn into the air cleaner housing and diffused through the cartridge filters. The air flow through the air filter 10 is generally uniform since the filter cartridge density generally decreases with distance from the air inlet, however, at the same time the air flow tends to decrease as it passes about the filter. Thus, essentially the decrease in air diffusion is compensated for by a change in the resistance to the diffusion thus providing a more uniform air flow. The uniform air flow through the air filter results in uniform air flow through the throat of the carburetor. The metal wool is a superior filter medium. It is able to trap and hold even the smallest particles of dirt and grit and does not readily deteriorate in efficiency when exposed to moist, damp or wet environments. The metal wool may also be color coded to denote wool density thereby making the replacement of filter cartridges practically foolproof. Only two different styles of cartridges are necessary.

In a preferred embodiment the metal wool has a charge maintained thereon for the purpose of attracting dust particles so that little or no dirt is permitted to enter the carburetor throat. The charging of the metal wool is accomplished through a polarizer 34 which is connected to the engine electrical system by coupling 36 and to the metal wool 32 in air filter 10 by coupling 38. With the engine electrical system as a source of current, the polarizer controls the amount of current applied to the metal wool which attracts the dust particles brought into the air cleaner housing through inlet 16.

While specific embodiments have been shown and described, many variations are possible. The particular shape of the air filter housing and air filter including all horizontal and vertical dimensions may be changed as desired to suit the equipment with which it is used. The housing materials may vary although plastic is preferred. The configuration and number of the chambers may vary although the preferred embodiment shows 16 individual cartridge filters in their respective chambers. Also, in the embodiment described, there have been described air pervious partitions. In a more simplified version of the invention, partitions may be removed with the filters simply being supported between the side walls. In another embodiment in place of a petition a small ridge could be used in the base to locate the filter cartridges.

What is claimed is:

1. An air filter for filtering air to the carburetor of an internal combustion engine, comprising;
    a toroidal-shaped housing having a bottom and inner and outer air-pervious side walls,
    air cleaner housing means for supporting the toroidal-shaped housing defining with the housing a toroidal-shaped air passage adapted to extend about the outer side wall of the housing and having means defining an air inlet at one side of said housing and an outlet spaced from the inlet, said housing being positioned between the inlet and outlet,
    and a plurality of replaceable adjacent cartridge filters located within said housing and each comprising a metal wool,
    said filters each being of uniform density with different ones thereof having different porosity with the more dense filter disposed closer to the air inlet and the less dense filter disposed remote from the air inlet with said dense to less dense filters extending circumferentially,
    whereby uniform air dispersion occurs through the filters,
    said air flow passing from the air inlet branching in a circular flow to either side of the housing,
    said toroidal-shaped air passage having uniform width thereabout with uniformity of flow being attained by filter density variation.

2. An air filter as set forth in claim 1 wherein the maximum width of each filter through which air flow occurs is substantially the same for the different density filters.

3. An air filter as set forth in claim 1 wherein air passage at most places about the filter is through a filter material of only single density.

4. An air filter as set forth in claim 1, wherein said air cleaner housing means comprises at least a support base, said filter adapted to fit onto said support base overlying the throat of the carburetor so that air diffused through the filter passes to the open center thereof and into the carburetor throat.

5. An air filter as set forth in claim 4 wherein the housing means includes a cover.

6. An air filter as set forth in claim 5 wherein the cartridge filters comprise at least two, one having a higher density packaging of the wool than the other, said one filter disposed at said inlet.

7. An air filter as set forth in claim 4 wherein the cartridge filters comprise at least two, one having a higher density packing of the wool than the other, said one filter disposed adjacent said inlet.

8. An air filter as set forth in claim 7 wherein said metal wool comprises aluminum.

9. An air filter as set forth in claim 7 wherein said metal wool comprises copper.

10. An air filter as set forth in claim 7 wherein the metal wool is electrically charged.

11. An air filter as set forth in claim 7 including three different density filters, the less dense filters being progressively disposed about the housing further from the air inlet.

12. An air inlet as set forth in claim 11 including a plurality of individually replaceable filters in each density type.

13. An air filter as set forth in claim 11 wherein said filters are color coded to indicate filter density.

* * * * *